US009266574B1

(12) United States Patent
Lippman et al.

(10) Patent No.: US 9,266,574 B1
(45) Date of Patent: Feb. 23, 2016

(54) AUTOMATICALLY DEPLOYED BICYCLE SUPPORT

(71) Applicant: Ford Global Technologies, LLC, Dearborn, MI (US)

(72) Inventors: Mark Allan Lippman, New Baltimore, MI (US); Mangala A. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/464,617

(22) Filed: Aug. 20, 2014

(51) Int. Cl.
*B62H 1/06* (2006.01)
(52) U.S. Cl.
CPC .......................................... *B62H 1/06* (2013.01)
(58) Field of Classification Search
CPC ............ B60R 9/10; B60R 11/00; B62H 3/04; B62H 1/06; B62J 11/00; B62K 3/02; B62K 25/04
USPC ........ 280/200, 81.1, 284, 293, 295, 296, 298, 280/300, 301; 211/5, 20
See application file for complete search history.

(56) References Cited

U.S. PATENT DOCUMENTS

| | | | |
|---|---|---|---|
| 5,419,575 A * | 5/1995 | Shepherd | 280/302 |
| 6,845,999 B2 | 1/2005 | Royal, Sr. et al. | |
| 6,979,013 B2 | 12/2005 | Chen | |
| 7,140,632 B2 | 11/2006 | Ridley | |
| 2013/0225360 A1 | 8/2013 | Hirn | |

FOREIGN PATENT DOCUMENTS

| | | | |
|---|---|---|---|
| CA | 1206176 A | * | 6/1986 |
| CN | 2825435 Y | | 10/2006 |
| EP | 2176117 B1 | | 3/2011 |
| WO | WO 96/15934 | | 5/1996 |
| WO | WO 2008/087659 | | 7/2008 |

OTHER PUBLICATIONS

Fully Automated Center Stand for Bicycle, grabcad.com/library/fully-automated-center-stand-for-bicycle-1, Jun. 4, 2014, 5 pages.

* cited by examiner

*Primary Examiner* — Tony H. Winner
*Assistant Examiner* — Felicia L Brittman
(74) *Attorney, Agent, or Firm* — Frank MacKenzie; Bejin Bieneman PLC

(57) ABSTRACT

A bicycle support mechanism includes a shaft that is connectable to a frame of a bicycle. The shaft is in the form of a hollow tube and includes a top end and a bottom end. A support arm is telescopically deployable downward from the bottom end of the shaft. A friction wheel is rotatably supported by the shaft. The friction wheel extends from the top end of the shaft such that the friction wheel and is arranged to be in frictional contact with a bicycle wheel.

19 Claims, 13 Drawing Sheets

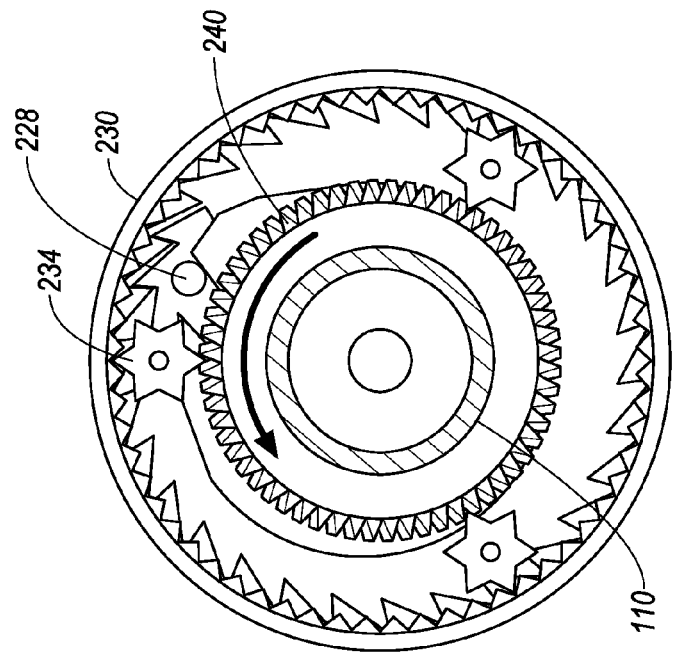
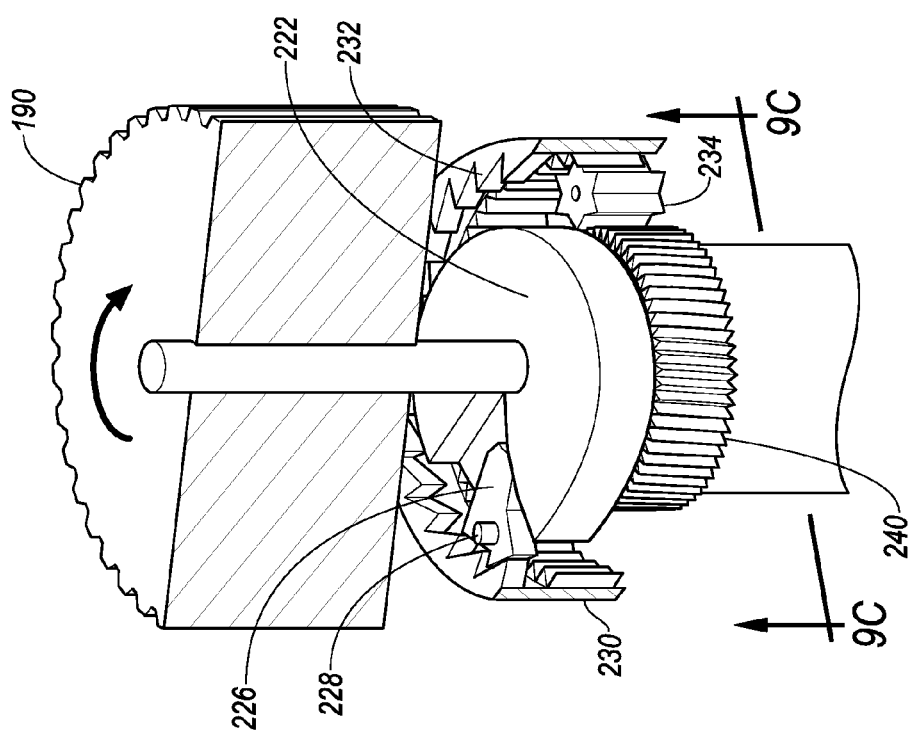
FIG. 9C
FIG. 9B

AUTOMATICALLY DEPLOYED BICYCLE SUPPORT

BACKGROUND

Two wheel vehicles such as bicycles can be equipped with a support stand to keep the vehicle upright when not in motion. There are situations, while riding a two wheeled vehicle, where the rider needs to use his/her legs to keep the vehicle upright, for example when stopped at a traffic light, when about to stop, when going very slow, etc. Therefore, use of two wheeled vehicles may be limited to people with the ability to use their legs to support the vehicle at very slow to no-speed conditions.

Further, the need to support a two wheel vehicle when moving slowly or stopped can pose a danger of a rider falling if a foot or feet are stuck in place. For example, a shoe lace can get tangled on a peddle shaft or a foot can get stuck in a toe clip, causing the rider along with the bicycle to fall to the ground. Physical limitations can also make it difficult or impossible to operate a kick stand.

DRAWINGS

FIG. 9B is a cutaway view of the actuator of FIG. 8A showing operation of outer lock teeth and outer wheel teeth.

FIG. 9C is a bottom view of an actuator showing the cooperation of the outer lock teeth and the outer wheel teeth.

DETAILED DESCRIPTION

Figure 1:
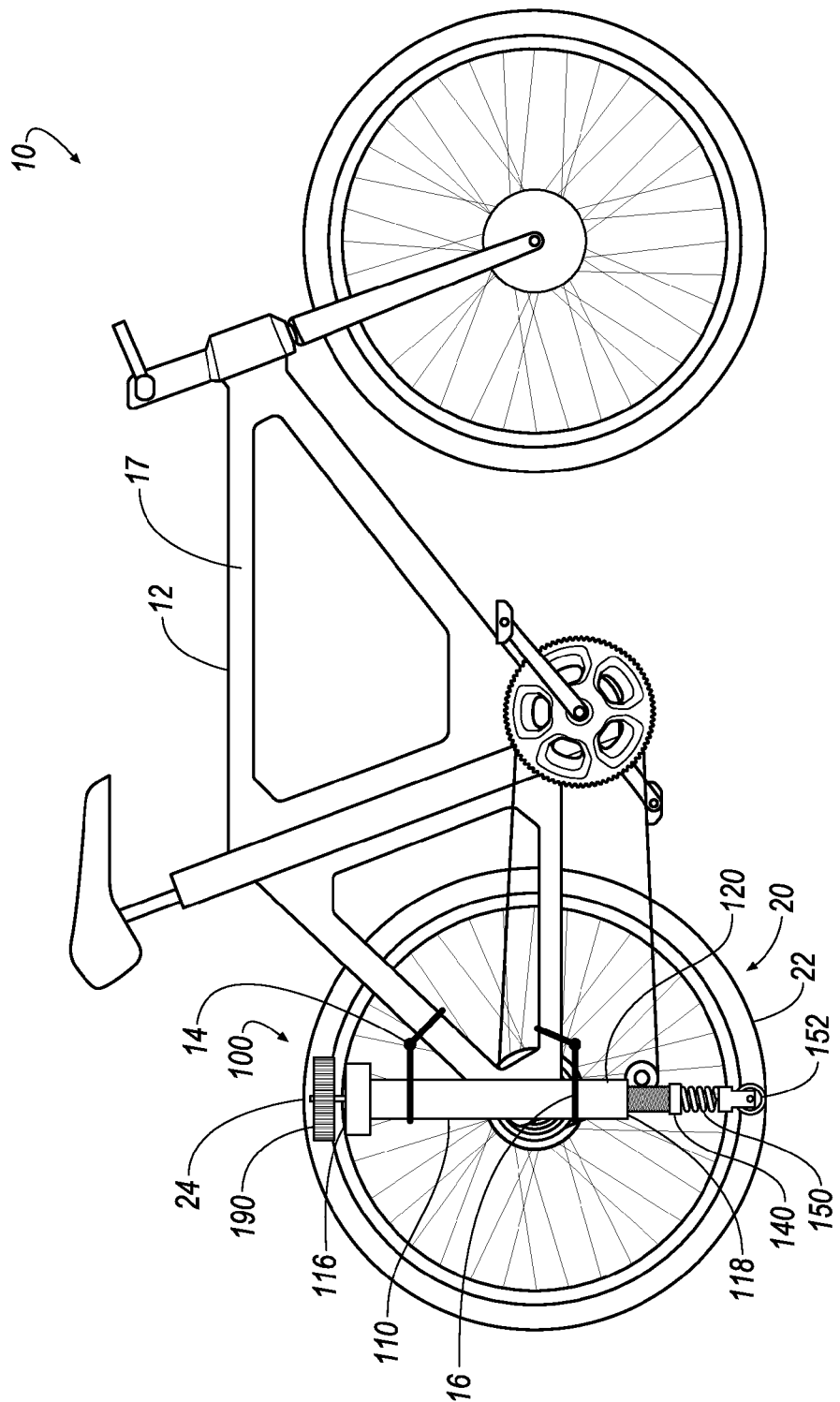
FIG. 1 is a side view of a bicycle including an exemplary bicycle support mechanism.

Disclosed herein and illustrated in the various figures is a support mechanism 100 including a shaft 110 that is connectable to a bicycle 10 frame 12. As used herein, a bicycle can be any suitable two wheel vehicle, e.g., a bicycle, an electrified bicycle, a moped, a scooter, a motorcycle, etc. The bicycle 10 includes a bicycle wheel 20. The bicycle wheel 20 includes a tire 22.

The shaft 110 of the support mechanism 100 is in the form of a hollow tube and includes a top end 116 and a bottom end 118. A support arm 120 is telescopically deployable downward from the bottom end 118 of the shaft 110. A friction wheel 190 is rotatably supported by the shaft 110. The friction wheel 190 extends from the top end 116 of the shaft 110 such that the friction wheel 190 is arranged to be in frictional contact with a part of the bicycle wheel 20, e.g., the tire 22.

The support mechanism 100 is driven by the friction wheel 190 to deploy the support arm 120 when the bicycle 10 is moving slowly, below a low speed threshold, e.g., 3 mph at which the bicycle might begin to wobble. The support mechanism 100 raises the support arm 120 when the bicycle 10 is moving quickly, above a high speed threshold, e.g., 5 mph, at which the bicycle tends to remain stably upright. In this manner, the support arm 120 is automatically deployed when the bicycle 10 is moving slowly or stopped and helps to maintain the bicycle 10 in an upright position. Therefore, a rider does not need to use his/her feet to maintain stability of the bicycle 10.

Figure 2:
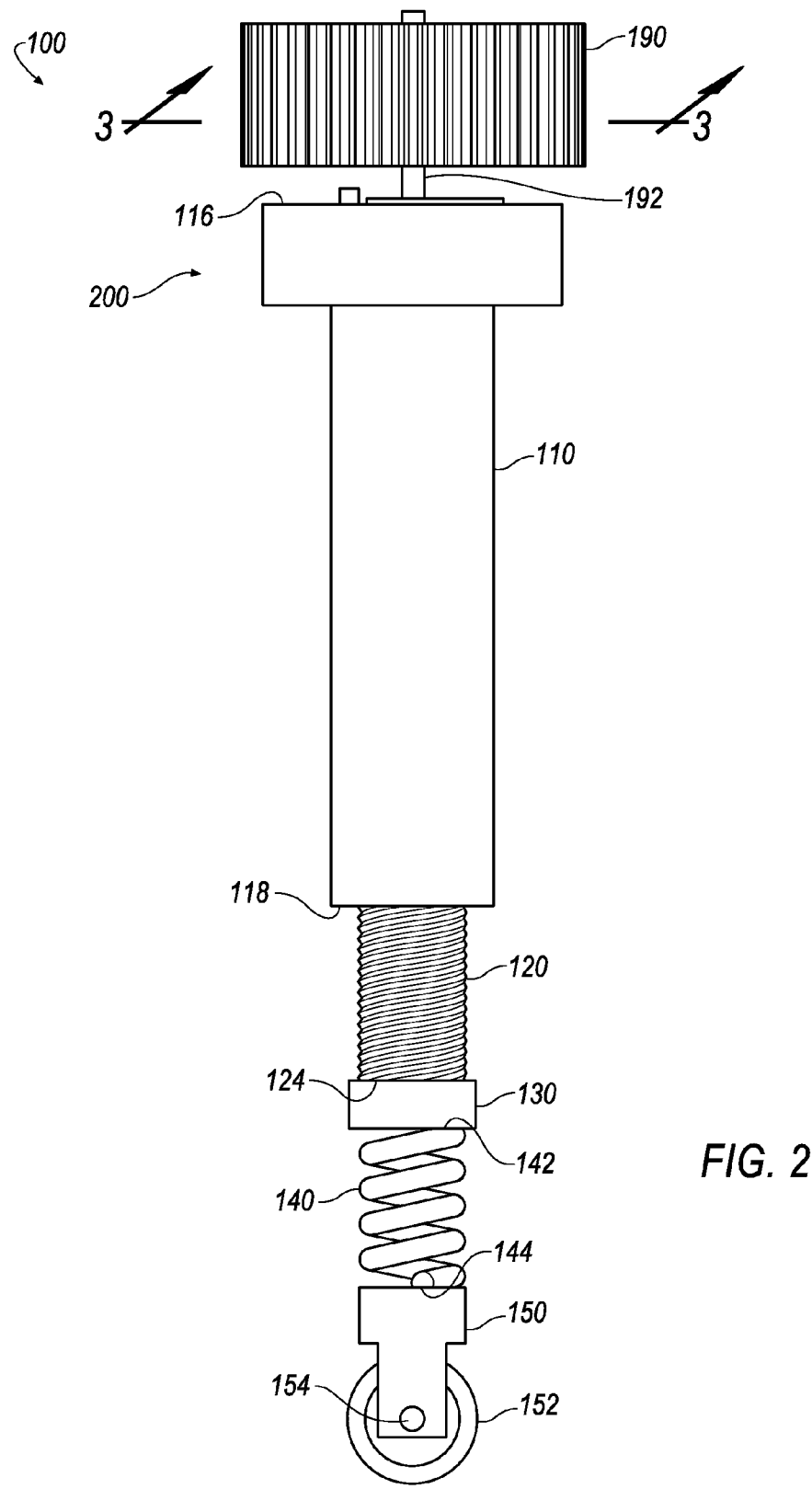
FIG. 2 is side view of an exemplary bicycle support mechanism of FIG. 1.

Referring to FIGS. 1 and 2, a bicycle 10 includes a frame 12. The frame 12 has a frame extension 14. The bicycle wheel 20 includes the tire 22, and is rotatably supported on the frame 12, e.g., in a conventional manner.

A support mechanism 100 includes a shaft 110. The shaft 110 is rotatably attached to the frame 12. The shaft 110 has a top end 116 and a bottom end 118. The shaft 110 is disposed at a first side 17 of the bicycle frame 12 such that the top end 116 of the shaft 110 is proximate to a top 24 of the bicycle wheel 20, e.g., the top end 116 is generally a portion of the shaft 110 nearest to the bicycle wheel 20 top 24 relative to any other portions of the shaft 110. A frame extension 14 may be used to support the shaft 110 on the frame 12. The frame extension 14 extends from the frame 12 to a point at or below the shaft 110 top end 116, and allows the shaft 110 to be secured to the frame 12. In the example shown in FIG. 1, the shaft 110 extends in a substantially vertical direction, with the top end 116 of the shaft located near the top 24 of the bicycle wheel 20. A second frame extension 16 may alternatively or additionally be used to rotatably support the shaft 110 on the frame 12. For example, the second frame extension 16 may extend outward from the frame 12 near the axle (not shown) of the wheel 20 and rotably support the shaft 110 near the bottom end 118.

As shown in FIGS. 1 and 2, a support arm 120 is telescopically deployable and extends from the bottom end 118 of the shaft 110.

A friction wheel 190 is rotatably supported at the top end 116 of the shaft 110 by a rod 192. The friction wheel 190 is disposed on the support mechanism 100 such that the friction wheel 190 is in frictional contact with a part of the bicycle wheel 20, e.g., the tire 22. In this manner, rotation of the bicycle wheel 20 can turn the friction wheel 190.

The support arm 120 is threadably engaged with the shaft 110 such that, when the shaft 110 rotates in a first direction, the support arm 120 is lowered, and when the shaft 110 rotates in a second direction, the support arm 120 is raised.

As shown in FIGS. 3 and 4A-4C, the shaft 110 has an interior surface 112. A nut 300 may be fixedly attached to the interior surface 112 of the shaft 110 proximate to the bottom end 118. The support arm 120 may be provided with threads 122 on an exterior surface 123. As further shown in FIG. 3, the nut 300 and the support arm 120 may be appropriately sized such that the threads 122 of the support arm 120 engage the nut 300. Accordingly, the support arm 120 may threadably engage the nut 300 such that when the shaft 110 rotates the support arm 120 is raised into or lowered out of the shaft 110.

Figure 3:
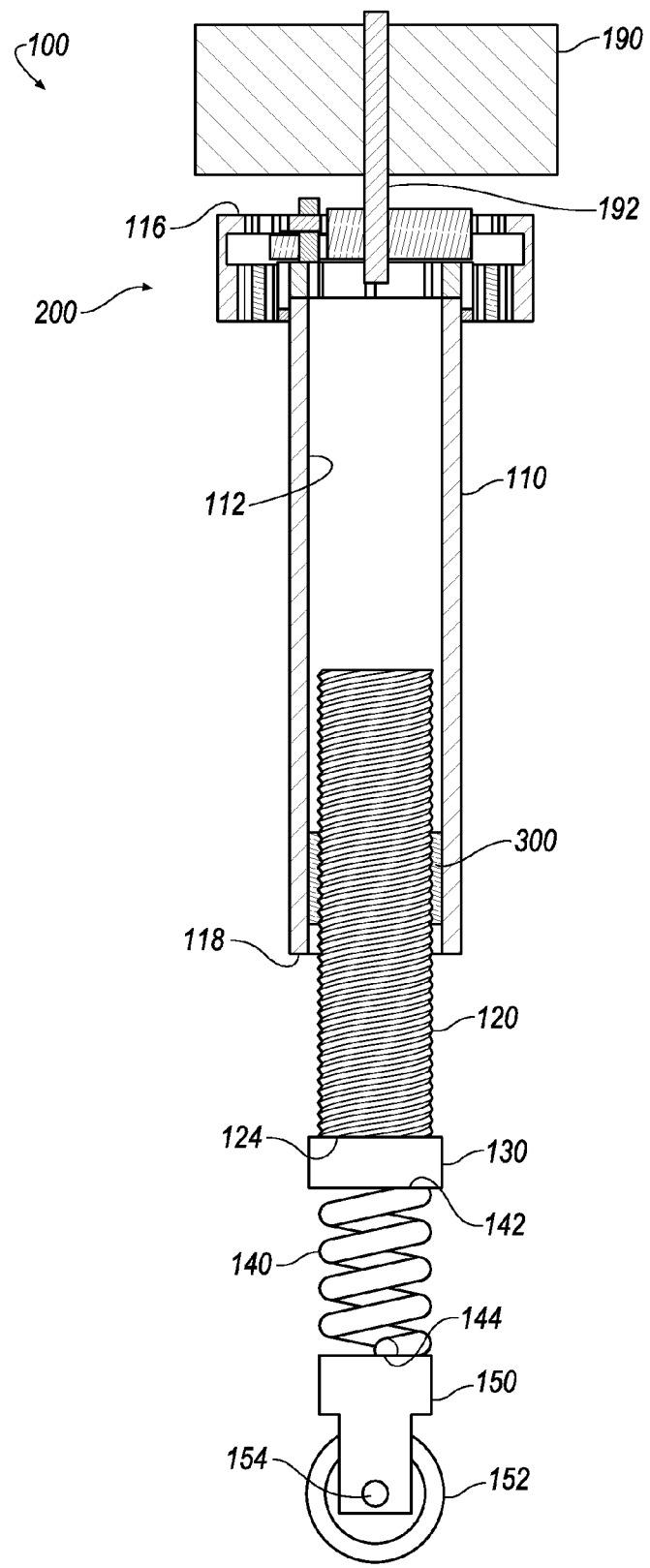
FIG. 3 is a cross-sectional view of an exemplary bicycle support mechanism of FIG. 1.
Figure 4C:
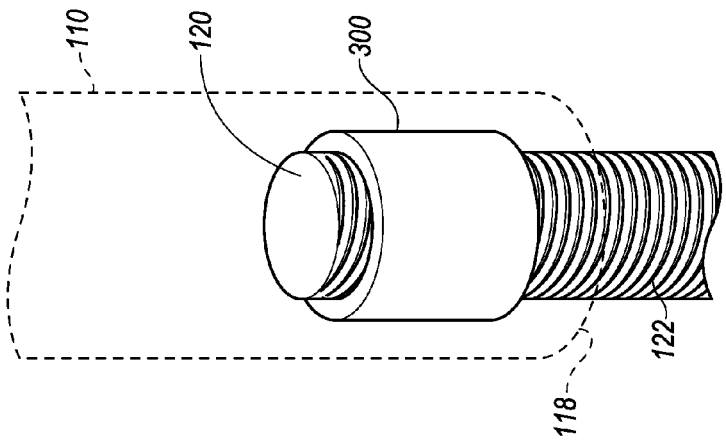
FIG. 4C is a semi-transparent view of a section of the bicycle support mechanism of FIG. 1 showing the cooperation of a nut and a support arm.
Figure 4B:
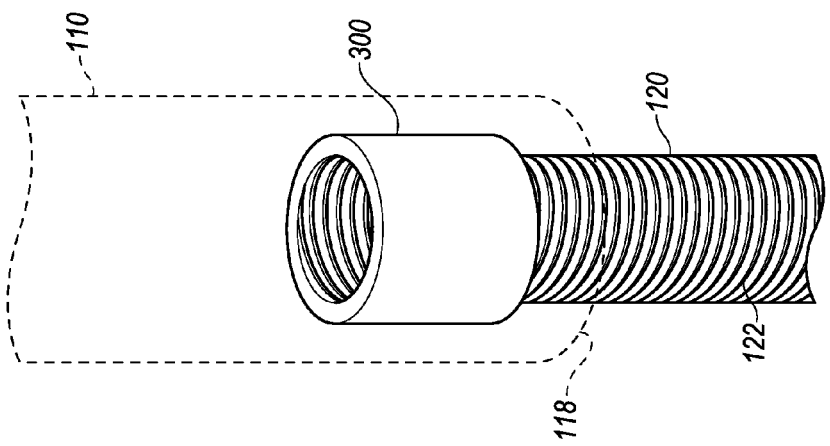
FIG. 4B is a semi-transparent view of a section of the bicycle support mechanism of FIG. 1 showing the disposition of a nut.
Figure 4A:
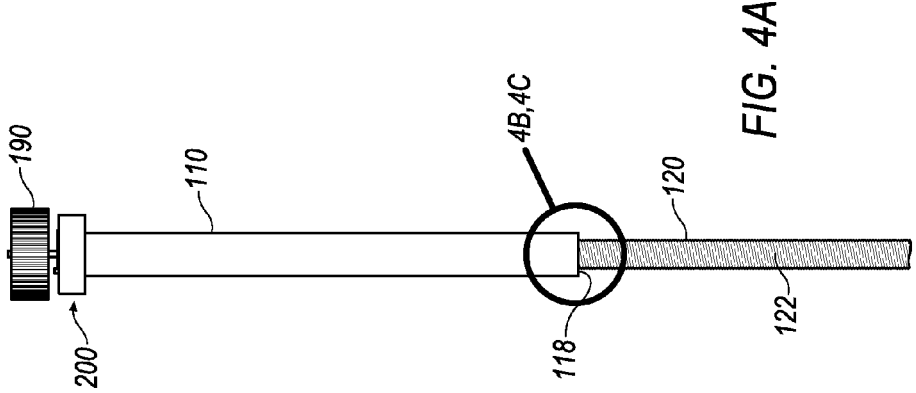
FIG. 4A is a plan view of the bicycle support mechanism of FIG. 1.

Referring to FIGS. 2 and 3, the support mechanism 100 may include a suspension spring 140, the spring having a first end 142 and a second end 144. The first end 142 is attached to the bottom end 118 of the support arm 120. The support mechanism 100 may further include a wheel support structure 150 connected to the second end 144 of the suspension spring 140. A support wheel 152 may be rotatably supported by the wheel support structure 150.

As shown in FIGS. 2 and 3, a connecting cap 130 may be used to connect the first end 142 of the suspension spring 140 to the bottom end 124 of the support arm 120. Note, however, that other connectors for connecting the spring 142 the support arm 120 may be used instead of the cap 130.

The suspension spring 140 allows the support mechanism 100 to respond to irregularities in a road surface and to reduce or minimize effects of these irregularities while continuing to provide a support function to the bicycle 10.

However, the suspension spring 140 may be omitted from the support mechanism 100. The wheel support structure 150 may be connected to the bottom end 124 of the support arm 120 and a support wheel 152 may be attached to the wheel support structure 150.

The support mechanism 100 includes an actuator 200 located at the top end 116 of the shaft 110, and arranged to move the support arm 120, the actuator 200 being driven by the friction wheel 190.

As shown in FIG. 2, the actuator 200 is disposed within the top end 116 of the shaft 110. The actuator 200 may be circular in shape. A first diameter of the shaft at the top end 116 may be greater than a second diameter of the remainder of the shaft 110 in order to accommodate the actuator 200.

As shown in FIGS. 2 and 3, a rod 192 is fixedly attached to the actuator 200 and extends upward from a center of the actuator 200. The friction wheel 190 is fixedly attached to the rod 192. In this manner, the friction wheel 190 drives the actuator 200.

Figure 5:
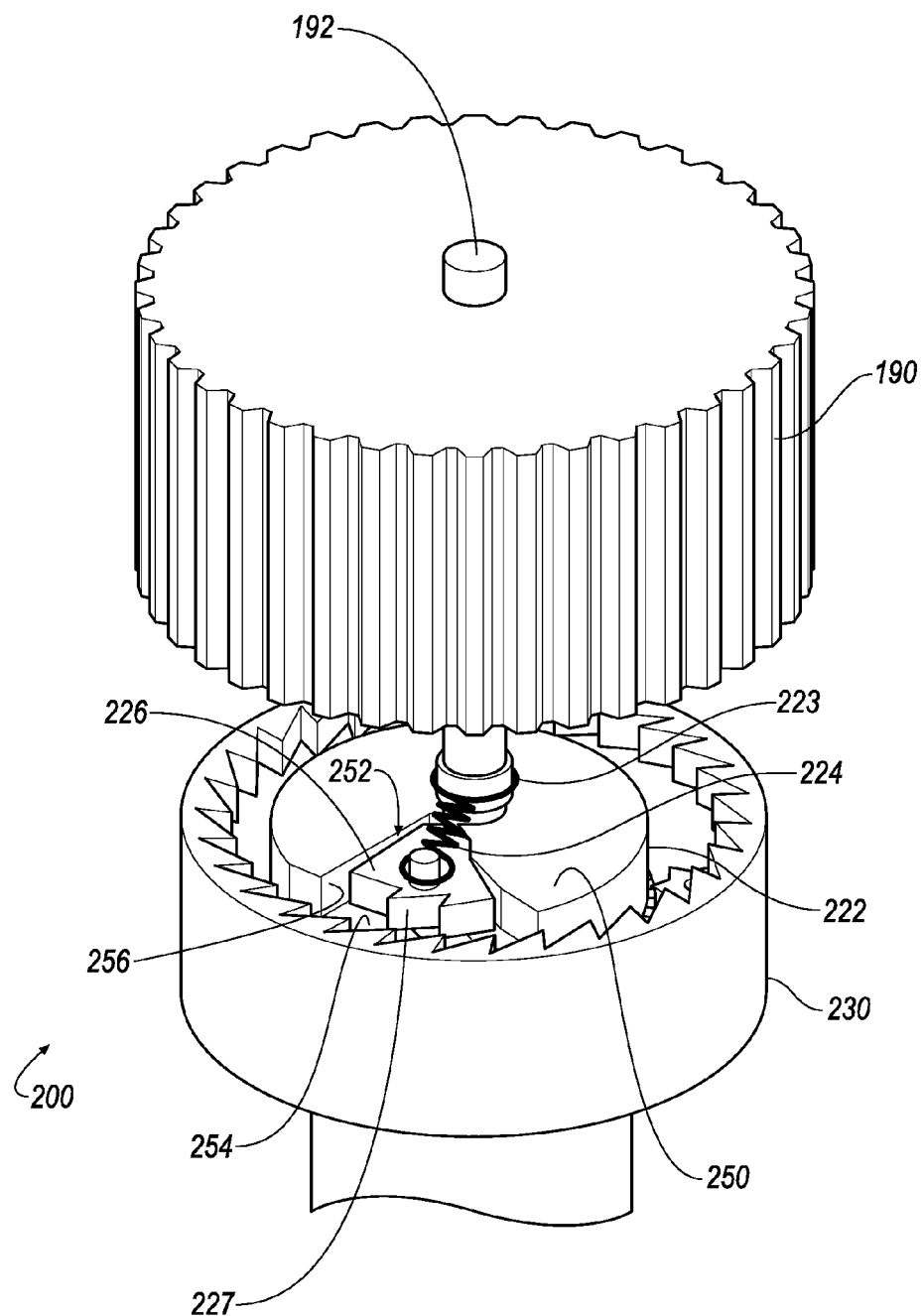
FIG. 5 is a perspective, partial cutaway view of an actuator including a friction wheel.
Figure 6:
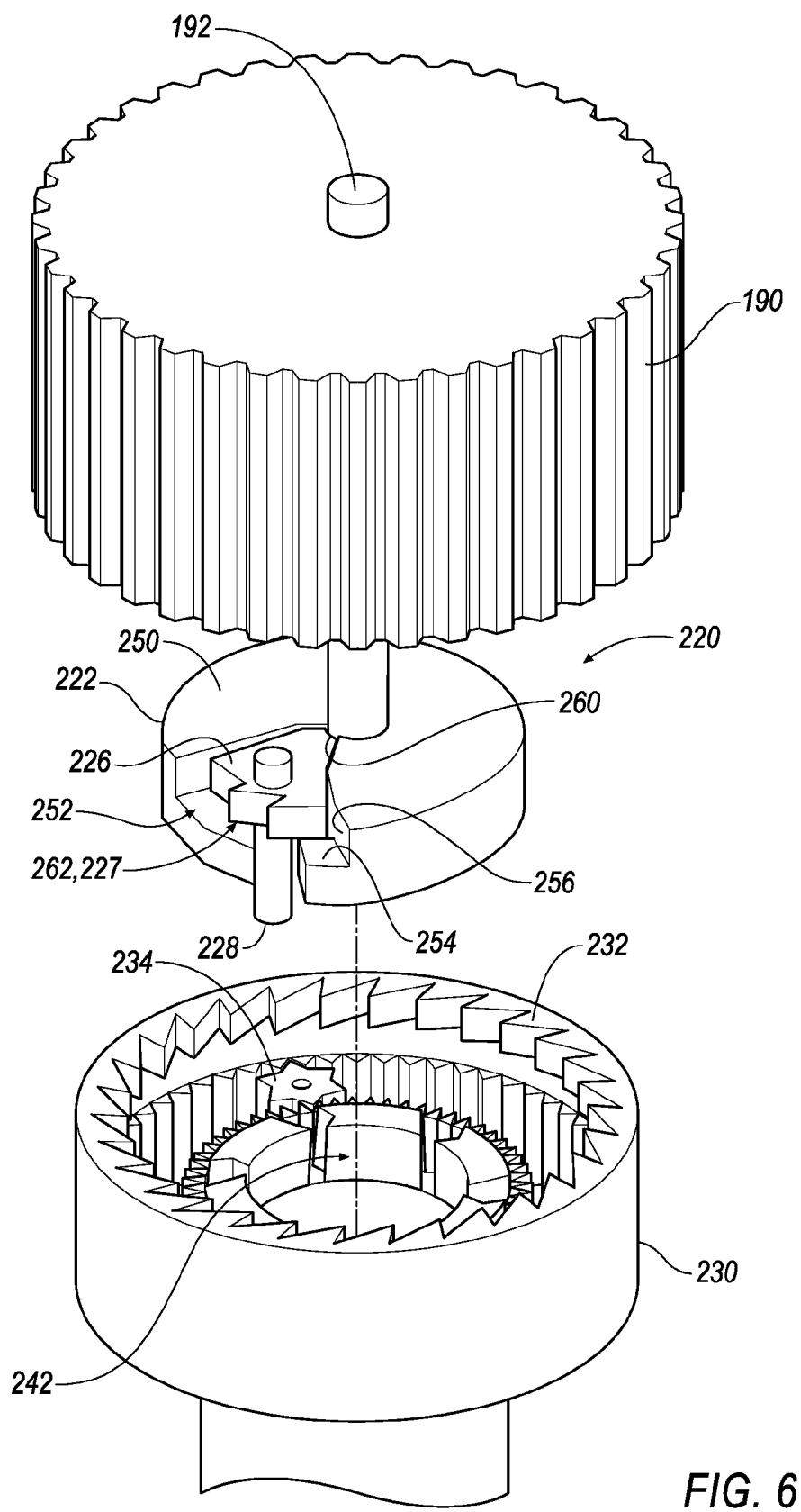
FIG. 6 is an exploded view of the actuator and friction wheel of FIG. 5.

Referring to FIGS. 5 and 6, the actuator 200 includes a centrifugal mechanism 220 rotatably supported within the shaft 110, the centrifugal mechanism 220 being substantially circular in shape, the rod 192 extending from a center point of the centrifugal mechanism 220 and fixedly connecting the friction wheel 190 to the centrifugal mechanism 220 such that the friction wheel 190 drives rotation of the centrifugal mechanism 220.

The centrifugal mechanism 220 includes a centrifugal disc 222 being rotatably supported within the shaft 110, the centrifugal disc 222 being substantially circular in shape, the rod 192 extending from a center point of the centrifugal disc 222 and fixedly connecting the friction wheel 190 to the centrifugal disc 222. The centrifugal disc 222 has a centrifugal lock support surface 254, and guiding portions 256 extending upward from the centrifugal lock support surface 254, and radially outward from the center point. A centrifugal lock 226 is slidably disposed on the centrifugal lock support surface 254 between the guiding portions 256, the centrifugal lock 226 including outer centrifugal lock teeth 227 and a lock post 228. A bushing 223 rotatably connects to the rod 192, and a bias spring 224 connects the centrifugal lock 226 to the bushing 223.

FIGS. 5 and 6 show the centrifugal mechanism 220. The centrifugal disc 222 is shaped substantially as a cylinder with a recess 252 formed therein. The guiding portions 256 define sides of the recess 252 and extend radially outward approximately from the center point of the centrifugal disc 222. The guiding portions 256 extend vertically downward from an upper surface 250 of the centrifugal disc 222. The centrifugal lock support surface 254 defines the bottom of the recess 252.

As shown in FIGS. 5 and 6, the resulting recess 252 is substantially triangular in shape with an apex of the triangle located proximate the center point of the centrifugal disc 222. The centrifugal lock 226 is slidably supported within the recess 252 on the centrifugal lock support surface 254.

The centrifugal lock 226 is also substantially triangular in shape, and fits within the recess 252 formed in the centrifugal disc 222. The centrifugal lock 226 has an apex 260. An outer edge 262 of the centrifugal lock 226 has outer lock teeth 227. The centrifugal lock 226 includes a lock post 228, the lock post extending downward from centrifugal lock 226.

The actuator 200 includes a lowering gear mechanism 241 and a raising gear mechanism 229, the lowering gear mechanism 241 and raising gear mechanism 229 being selectively engaged and driven by the centrifugal mechanism 200.

Referring to FIG. 6, the lowering gear mechanism 241 includes capstan gear 242. The capstan gear 242 is fixably attached to the top end 116 of the shaft 110.

Figure 7A:
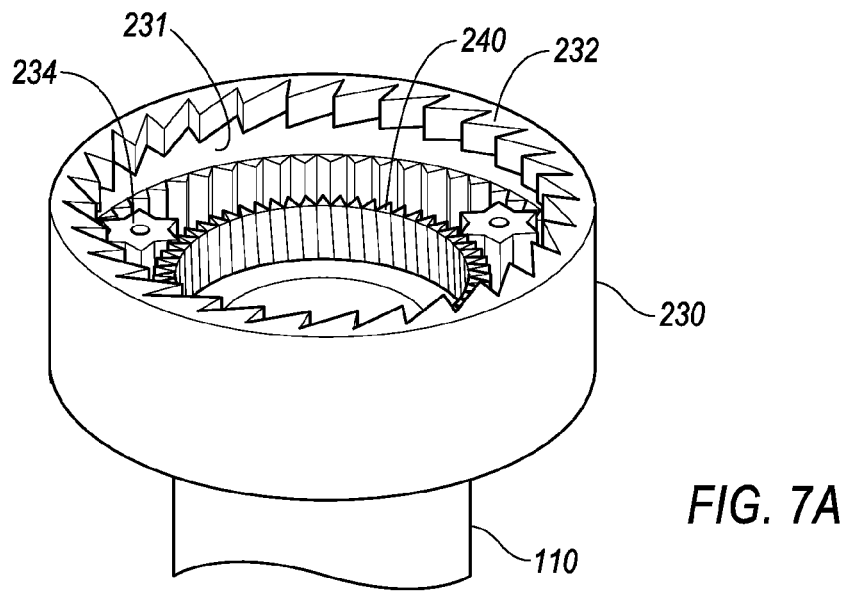
FIG. 7A is a perspective view of a raising gear mechanism.
Figure 7B:
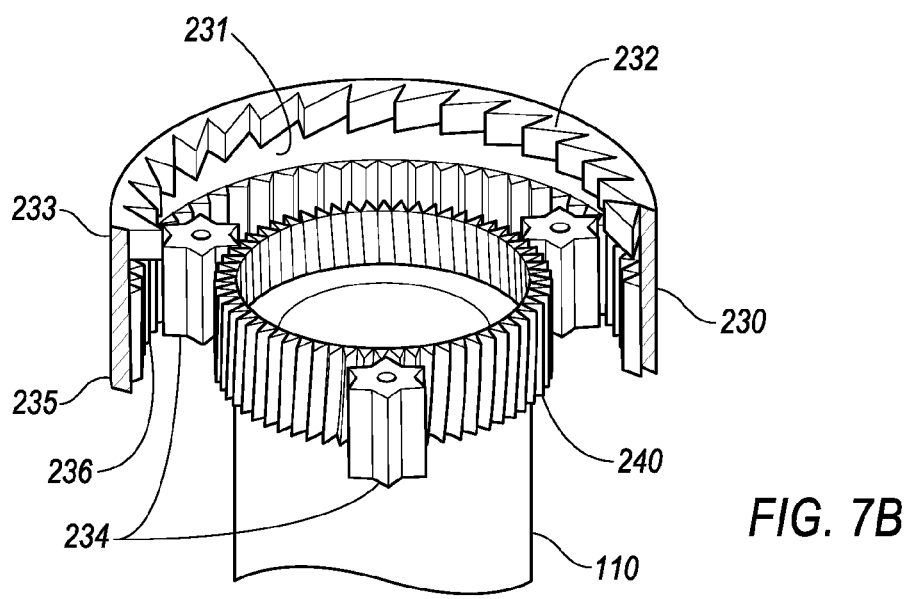
FIG. 7B is a perspective view of the raising gear mechanism of FIG. 7A with a portion of an outer wheel cut away.
Figure 7C:
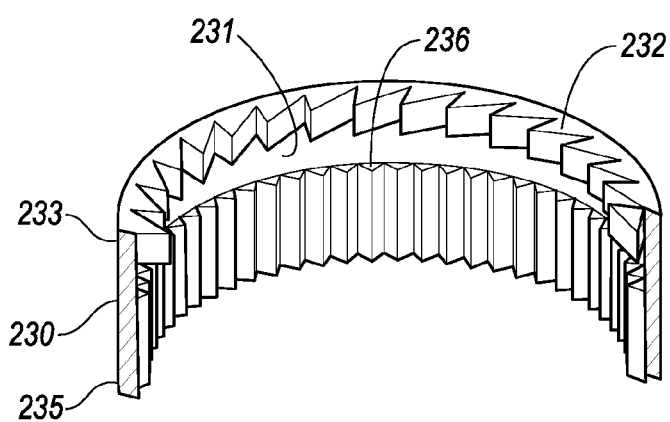
FIG. 7C is a perspective view of the outer wheel with a front portion cutaway.

Referring to FIGS. 7A, 7B and 7C, the raising gear mechanism 229 includes an outer wheel 230. The outer wheel 230 is rotatably supported on the top end 116 of the shaft 110. The outer wheel 230 is in the form of a hollow cylinder and has an interior surface 231. As shown in FIG. 7C, outer wheel teeth 232 are disposed at a top portion of the interior surface 231 of the outer wheel 230. Further as shown in FIG. 7C, sun gear outer teeth 236 are disposed on a bottom portion of the interior surface 231 of the outer wheel 230.

As shown in FIG. 7B, the raising gear mechanism 229 further includes sun gear inner teeth 240. The sun gear inner teeth 240 are formed at the top end 116 of the shaft 110.

In addition, the raising gear mechanism 229 includes a plurality of intermediate sun gears 234. The intermediate sun gears 234 are disposed between the sun gear outer teeth 236 and the sun gear inner teeth 240.

When the centrifugal disc 222 is rotating at or below a first predetermined rotational speed, the centrifugal lock 226 is held in a first, radially inward position on the centrifugal disc 222, and engages the lowering gear mechanism 241. When the centrifugal disc 222 is rotating at a speed above a second predetermined rotational speed, the centrifugal lock moves into a second, radially outward position on the centrifugal disc 222, and engages the raising gear mechanism 229.

Figure 8A:
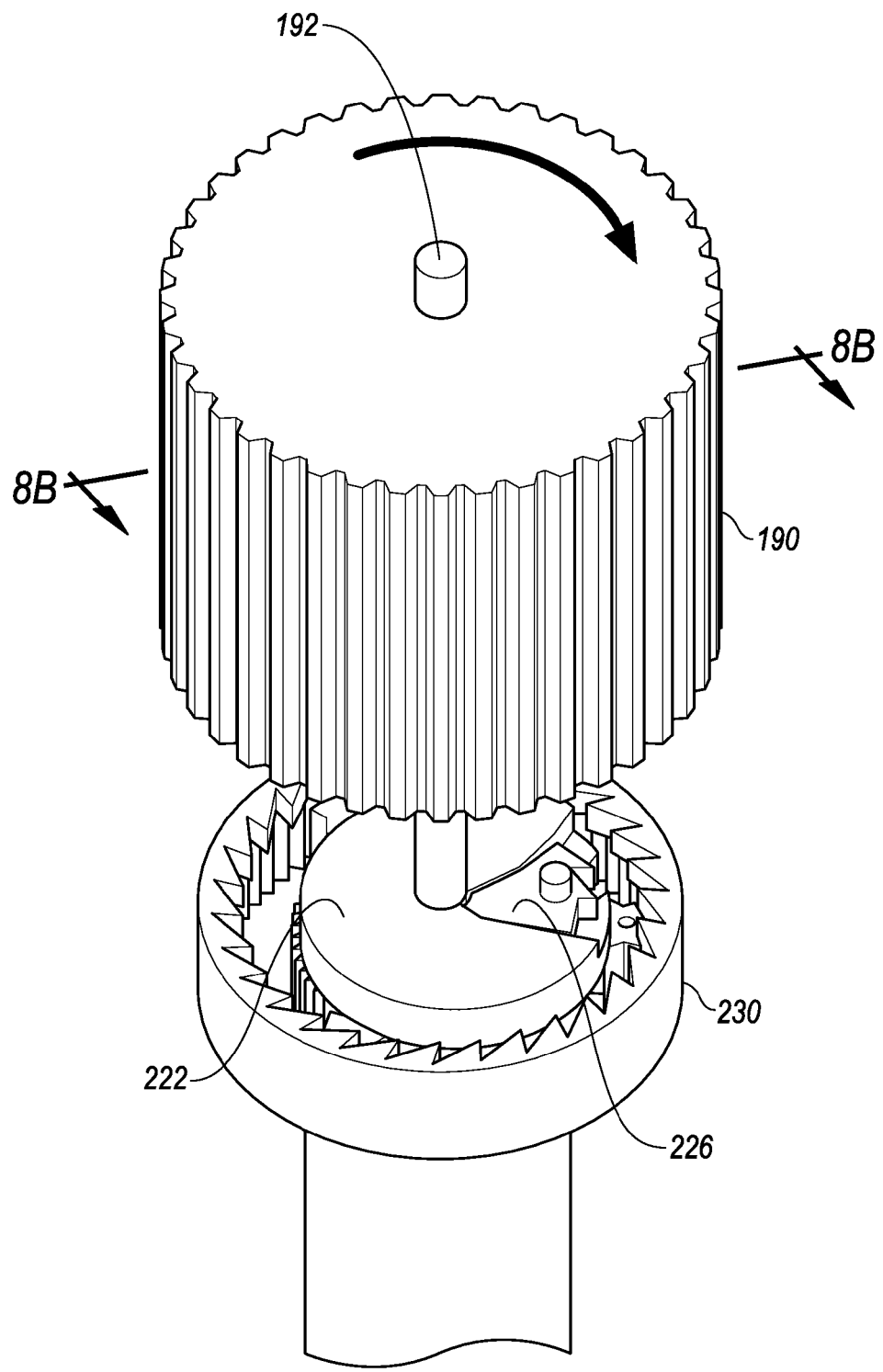
FIG. 8A is a perspective view of an actuator with an actuator lock being in a first, inward position.

Referring to FIGS. 5 and 8A, when the centrifugal disc 222 is at rest, and no centrifugal force is exerted on the centrifugal lock 226, the centrifugal lock 226 is biased in a first position by the bias spring 224. In the first position, the centrifugal lock 226 is held radially inwardly with respect to the disc 222 within the recess 252. In the first position, the outer lock teeth 227 remain inside an outer periphery of the centrifugal disc 222. The lock post 228 is held radially inwardly with respect to the disc 222, in a position where the lock post 228 can engage the capstan gear 242.

The lowering gear mechanism 241 includes the capstan gear 242. The capstan gear 242 is fixedly attached to the top end 116 of the shaft 110. When the centrifugal disc 222 is rotating at a speed at or below the first predetermined rotational speed, e.g., the rotational speed corresponding to a bicycle speed of 3 mph, the centrifugal lock 222 is held in the first, radially inward position on the centrifugal disc 222. The lock post 228 connects with the capstan gear 242. The shaft 110 is rotated by the centrifugal mechanism 220 in a first direction corresponding to the direction of rotation of the centrifugal disc 222. The rotation of the shaft 110 lowers the extending arm 120.

Figure 8C:
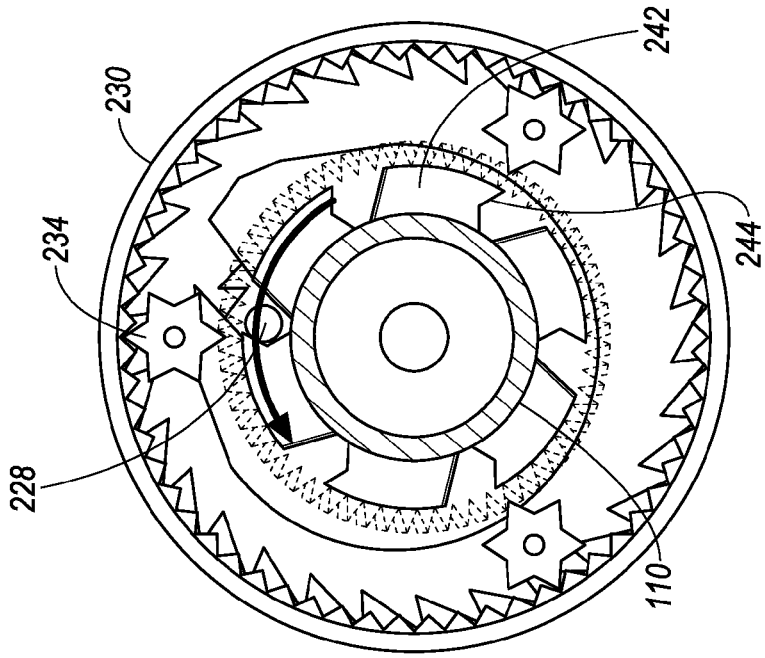
FIG. 8C is a bottom plan view of an actuator showing cooperation of a lock post and a capstan gear.
Figure 8B:
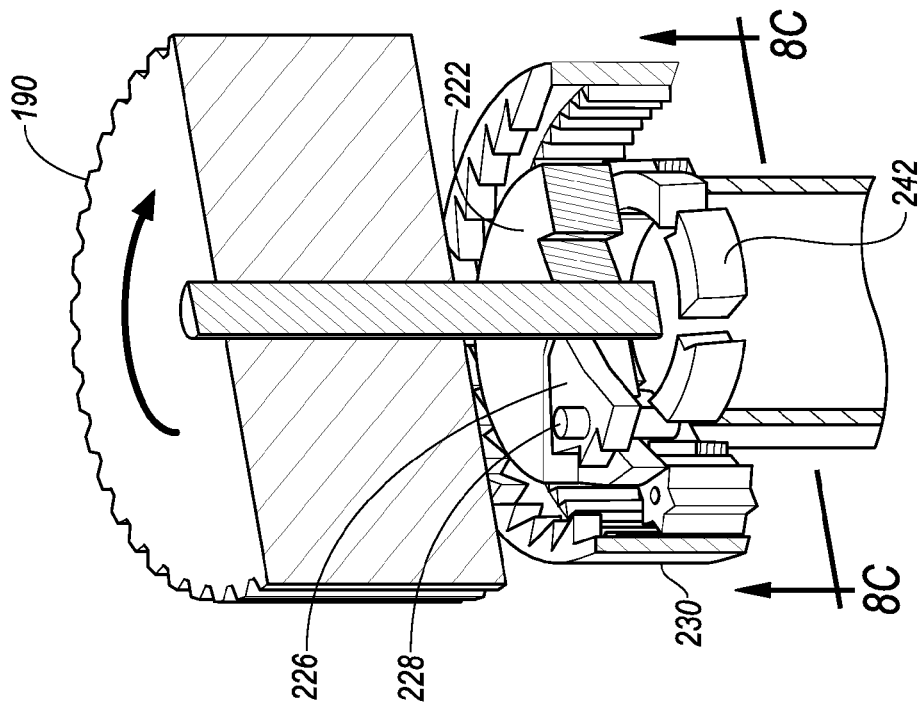
FIG. 8B is a cutaway view of a lowering gear mechanism showing cooperation of a lock post and a capstan gear.

Operation of the actuator 200 while lowering the support arm 120 is shown in FIGS. 8A, 8B and 8C. Each of FIGS. 8A, 8B and 8C show the centrifugal lock 226 in the first position. As shown in FIGS. 8B and 8C, in the first position, the lock post 228 is in a position to engage the capstan gear 242. When the lock post 228 is engaged with the capstan gear 242, the shaft 110 is driven to rotate in a direction and at a same rotational speed as the friction wheel 190. When the bicycle 10 is at rest, the centrifugal disc 222 does not rotate and the support arm 120 remains in place.

FIG. 8C is a bottom view of the actuator 200 showing slots formed in the capstan gear 242 for engaging with the lock post 228.

The raising gear mechanism 229 includes an outer wheel 230 having an inner surface 231, the inner surface 231 having an upper portion 233 having outer wheel teeth 232 for engaging the centrifugal lock 226, and a lower portion 235 forming sun gear outer teeth 236. Sun gear inner teeth 240 are formed on the upper end 116 of the shaft 110. A plurality of intermediate sun gears 234 are disposed between the sun gear outer teeth 236 and sun gear inner teeth 240.

When the centrifugal disc 222 is rotating at a speed above the second predetermined rotational speed, e.g., the rotational speed corresponding to a bicycle speed of 5 mph, the centrifugal lock 226 moves into the second, radially outward position on the centrifugal disc 222. The outer lock teeth 227 connect with the outer wheel teeth 232 of the outer wheel 230. The outer wheel 230 is rotated in a first direction corresponding to the direction of rotation of the centrifugal disc 222. The shaft 110 is rotated in a second direction opposite the first direction via the raising gear mechanism 229.

Figure 9A:
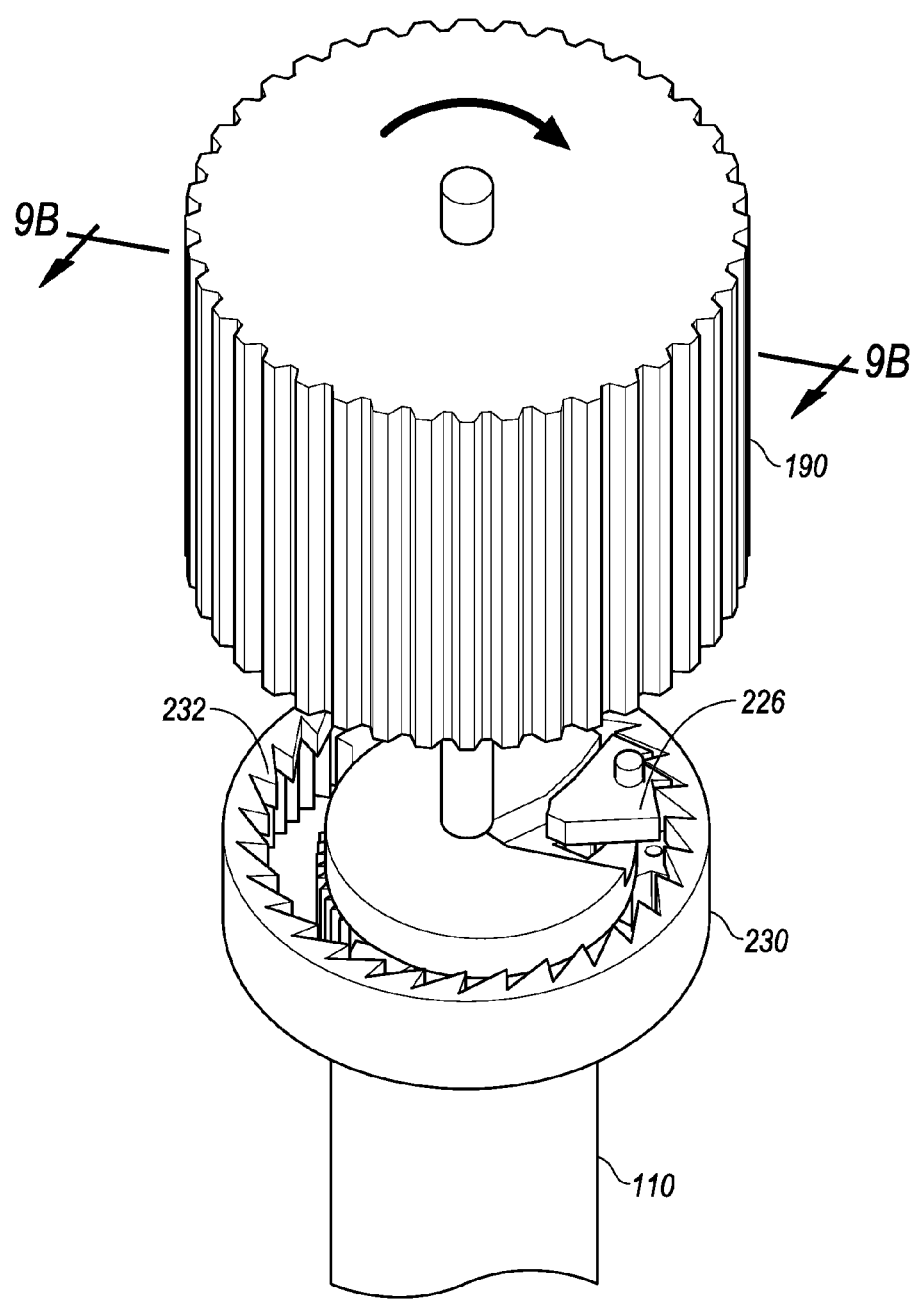
FIG. 9A is a perspective view of an actuator with an actuator lock in a second, outward position.

Operation of the actuator 200 while raising the support arm 120 is shown in FIGS. 9A, 9B and 9C. Each of FIGS. 9A, 9B and 9C show the centrifugal lock 226 in the second, radially outward position. As shown in FIGS. 9A and 9B, when the centrifugal lock 226 is in the second position, the outer lock teeth 227 of the centrifugal lock 226 are engaged with the outer wheel teeth 232. In this manner, the centrifugal mechanism 220 causes the outer wheel 230 to rotate in a same direction as the friction wheel 190.

As shown in FIGS. 9B and 9C, the sun gear outer teeth 236 on the lower portion 233 of the outer wheel 230 engage the plurality of intermediate sun gears 234. The plurality of intermediate sun gears 234 engage the sun gear inner teeth 240 disposed at the upper end 116 of the shaft 110. The configuration of the sun gear outer teeth 236, intermediate sun gears 234 and sun gear inner teeth 240 cause the shaft 110 to rotate in a direction opposite a direction of rotation of the friction wheel 190.

The support mechanism 100 includes a flat spring 400 disposed in the shaft 300 proximate to, and slightly above, the nut 300. The support arm 120 has an exterior surface 123, and threads 122 on the exterior surface 123. A cap 160 is attached to an upper end 124 of the support arm 120. The cap 160 extends above the support arm 120 and has a diameter substantially the same as a diameter of the support arm 120. The cap 160 has a top piece 162. The top piece 162 has a diameter larger than a diameter of the support arm 120.

When the support arm 120 has been fully extended in a downward direction, the support arm 120 exits the nut 300. The cap 160 is located within the nut 300. In this position, the flat spring 400 engages the top piece 162 and urges the cap 160 upwards so that when the shaft 110 reverses direction, the nut 300 and the threads 122 on the support arm 120 reengage.

Figure 10:
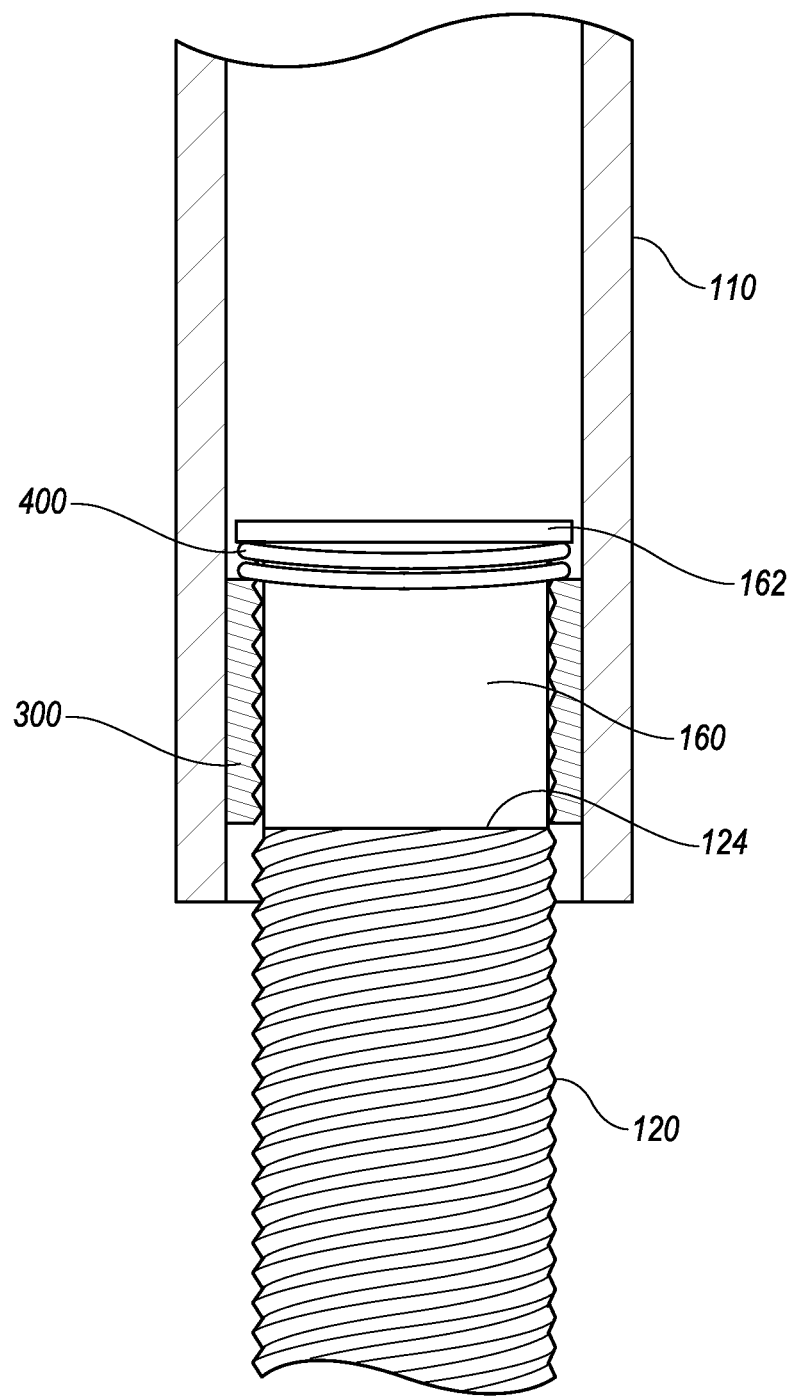
FIG. 10 is a cutaway view of a section of the bicycle support mechanism of FIG. 1 showing a support arm and a flat spring.

FIG. 10 shows the operation of the flat spring 400. When the support arm 120 has been fully extended, the threads 122 of the support arm 120 exit the nut 300. The cap 160 extends through the nut 300. The top piece 162 of the cap 160 is in contact with the flat spring 400, such that the flat spring 400 urges the cap upwards. When the shaft 110 reverses direction, the flat spring 400 urges the support arm 120 into the nut 300, allowing the nut 300 to threadably engage with the support arm 120.

An engagement/disengagement mechanism (not shown) to engage and disengage the friction wheel 190 from the bicycle wheel 20 may be used. For example, the engagement/disengagement mechanism may include an engagement spring (not shown). The support mechanism 100 may be biased by the engagement spring such that the friction wheel 190 is in frictional contact with the bicycle wheel 20. The engagement/disengagement mechanism may for example, include a lever and a cable. Activating the lever may, via the cable, disengage the support mechanism 100.

Figure 11:
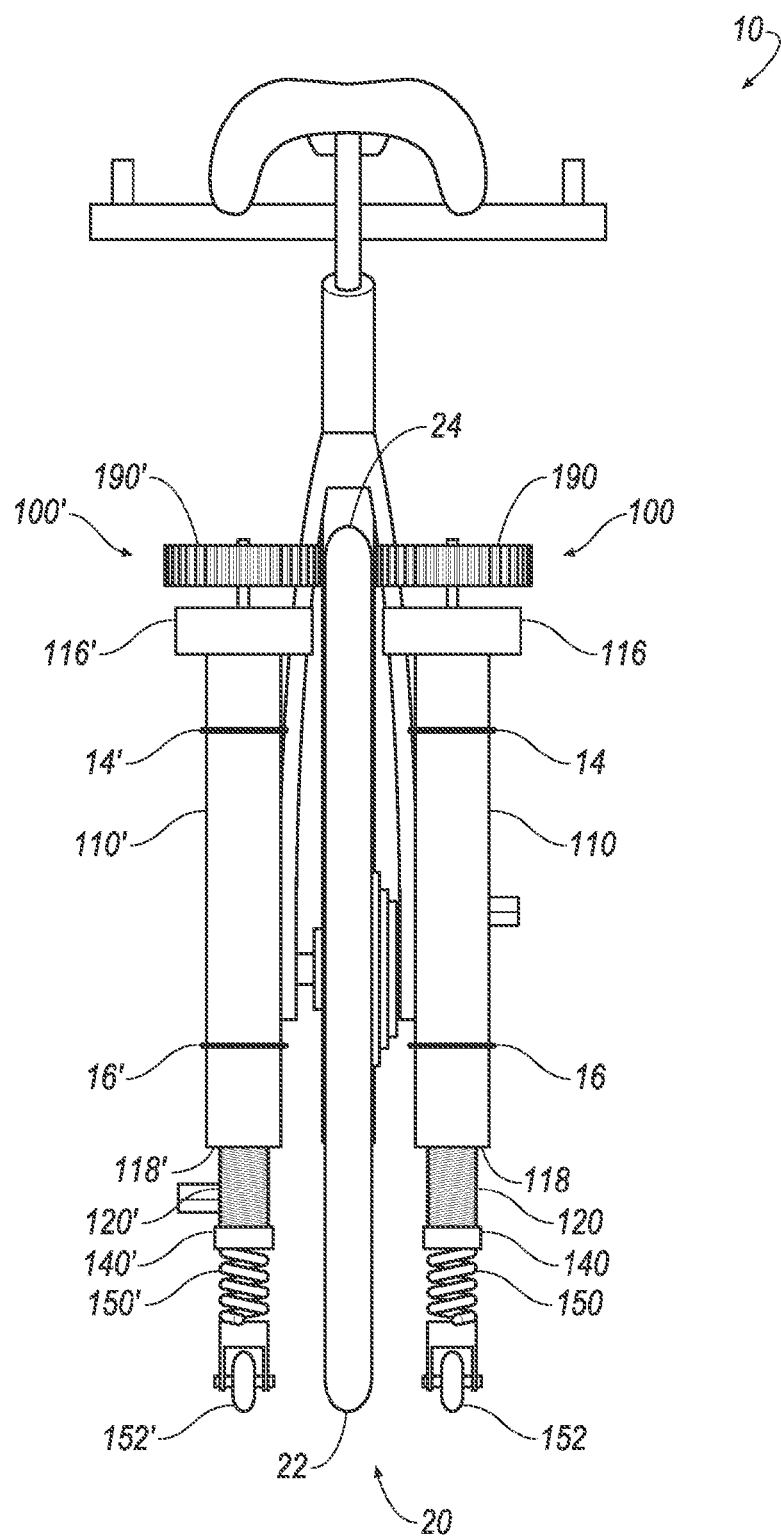
FIG. 11 is a rear view of the bicycle of FIG. 1, showing two support mechanisms.

As shown in FIG. 11, a second support mechanism 100', similar to support mechanism 100, may be included on a second side of the bicycle 10, opposite the first side 17 of the bicycle 10. The second support arm may be rotatably attached to the frame 12 on the second side of the bicycle 10 in the same manner as the support arm 100 is rotatably attached on the first side of the bicycle 10, except in mirror image.

The second support mechanism 100' includes shaft 110' including top end 116' and bottom end 118'. The shaft 110' may be attached with a frame extension 14' and another frame extension 16'. The second support mechanism 100' may further include second support arm 120', suspension spring 140', wheel support structure 150' and wheel 152'. Where applicable, the components of the second support mechanism 100' may be in mirror image of the components for the support mechanism 100. For example, threads on the support arm 120' may be in mirror image from threads on the support arm 120.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A bicycle support mechanism, comprising:
    a hollow shaft that is connectable to a bicycle frame, the shaft including a top end and a bottom end,
    a support arm telescopically deployable downward from the bottom end of the shaft,
    a friction wheel rotatably supported by the shaft, the friction wheel extending from the top end of the shaft such that the friction wheel is arranged to be in frictional contact with a bicycle wheel, and an actuator arranged to move the support arm, the actuator being driven by the friction wheel.

2. The mechanism of claim 1, wherein the actuator is located at the top end of the shaft.

3. The mechanism of claim 1, wherein the actuator includes a centrifugal mechanism rotatably supported within the shaft, the centrifugal mechanism being substantially circular in shape, a rod extending from a center point of the centrifugal mechanism and fixably connecting the friction wheel to the centrifugal mechanism, such that the friction wheel drives rotation of the centrifugal mechanism.

4. The mechanism of claim 3, wherein the centrifugal mechanism includes:
 a centrifugal disc rotatably supported within the shaft, the centrifugal disc being substantially circular in shape, the rod extending from a center point of the centrifugal disc and fixably connecting the friction wheel to the centrifugal disc, the centrifugal disc having a centrifugal lock support surface and guiding portions extending radially upward from the centrifugal lock support surface,
 a centrifugal lock slidably disposed on the centrifugal lock support surface between the guiding portions, the centrifugal lock including outer centrifugal lock teeth and a lock post,
 a bushing rotatably connected to the rod, and
 a spring connecting the centrifugal lock to the bushing.

5. The mechanism of claim 4, the actuator including a gear lowering mechanism and a gear raising mechanism, the gear lowering mechanism and gear raising mechanism each selectively engageable by the centrifugal mechanism.

6. The mechanism of claim 5, wherein:
 when the centrifugal disc is rotating at a speed at or below a predetermined rotational speed, the centrifugal lock is held in a first, radially inward position on the centrifugal disc and engages the gear lowering mechanism, and
 when the centrifugal disc is rotating at a speed above the predetermined rotational speed, the centrifugal lock moves into a second, radially outward position on the centrifugal disc and engages the gear raising mechanism.

7. The mechanism of claim 6, the gear lowering mechanism including a capstan gear fixably attached to the top end of the shaft, wherein:
 when the centrifugal disc is rotating at a speed at or below the predetermined rotational speed, the centrifugal lock is held in the first, radially inward position on the centrifugal disc, a lock post disposed on the centrifugal lock engages the capstan gear, the shaft is rotated by the centrifugal mechanism in a first direction corresponding to the direction of rotation of the centrifugal disc, and the rotation of the shaft lowers the extending arm.

8. The mechanism of claim 6, the gear raising mechanism including:
 an outer gear member rotatably mounted on the shaft and having an inner surface, the inner surface having an upper portion having outer wheel teeth for engaging the centrifugal lock and a lower portion forming sun gear outer teeth;
 sun gear inner teeth formed on the upper portion of the shaft; and
 a plurality of intermediate sun gears, the intermediate sun gears disposed between the sun gear outer teeth and the sun gear inner teeth;
 wherein, when the centrifugal disc is rotating at a speed above the predetermined rotational speed, the centrifugal lock moves into the second, radially outward position on the centrifugal disc, the outer centrifugal lock teeth connect with the teeth of the outer gear member, the outer gear member is rotated in a first direction corresponding to the direction of the centrifugal disc, and the shaft is rotated in a second direction opposite the first direction via the gear raising mechanism.

9. The mechanism of claim 1, wherein the support arm is threadably engaged with the shaft such that when the shaft rotates in a first direction the support arm is lowered, and when the shaft rotates in a second direction, the support arm is raised.

10. The mechanism of claim 1, further comprising a nut disposed on an interior surface of the shaft for engaging the support arm, wherein the support arm has an exterior surface, the exterior surface having threads thereon that threadably engage the nut.

11. The mechanism of claim 10, including a flat spring disposed in the lower portion of the shaft,
 wherein the support arm has an exterior surface, the exterior surface including a threaded portion thereon, a cap extending above the threaded portion having a diameter substantially a diameter of the threaded portion, and a top piece having a diameter larger than the diameter of the threaded portion, and
 further wherein, when the support arm has been fully extended downward, the threaded portion exits the nut, the cap is located within the nut, and the flat spring urges the cap upwards so that when the shaft reverses direction, the nut and the threaded portion of the support arm reengage.

12. The mechanism of claim 1, further comprising:
 a wheel support structure connected to the bottom end of the support arm; and
 a support wheel attached to the wheel support structure.

13. The mechanism of claim 1, further comprising:
 a suspension spring having a first end and a second end, the first end of the suspension spring attached to the bottom end of the support arm;
 a wheel support structure connected to the second end of the suspension spring; and
 a support wheel attached to the wheel support structure.

14. A bicycle comprising:
 a frame,
 a bicycle wheel supported by the frame,
 a hollow shaft connected to the bicycle frame, the shaft including a top end and a bottom end,
 a support arm telescopically deployable downward from the bottom end of the shaft,
 a friction wheel rotatably supported by the shaft, the friction wheel extending from the top end of the shaft such that the friction wheel is in frictional contact with the bicycle wheel, and
 an actuator arranged to move the support arm, the actuator being driven by the friction wheel.

15. The bicycle of claim 14, wherein:
 the actuator is located at the top end of the shaft, and includes a centrifugal mechanism rotatably supported within the shaft, the centrifugal mechanism being substantially circular in shape; further comprising:
 a rod extending from a center point of the centrifugal mechanism and fixably connecting the friction wheel to the centrifugal mechanism, such that the friction wheel drives rotation of the centrifugal mechanism.

16. The bicycle of claim 15, the centrifugal mechanism including:

a centrifugal disc being rotatably supported within the shaft, the centrifugal disc being substantially circular in shape, the rod extending from a center point of the centrifugal disc and fixably connecting the friction wheel to the centrifugal disc, the centrifugal disc having a centrifugal lock support surface, and guiding portions extending radially outward from the center point and upward from the centrifugal lock support surface, a centrifugal lock slidably disposed on the centrifugal lock support surface between the guiding portions, the centrifugal lock including outer lock teeth and a lock post, a bushing rotatably connected to the rod, and a bias spring connecting the centrifugal lock to the bushing.

17. The bicycle of claim 16, including:

a capstan gear fixably attached to the top end of the shaft;

an outer wheel rotatably mounted on the shaft and having an inner surface, the inner surface having an upper portion having outer wheel teeth for engaging the centrifugal lock and a lower portion forming sun gear outer teeth;

sun gear inner teeth formed on an exterior surface of an upper end of the shaft; and a plurality of intermediate sun gears, the intermediate sun gears disposed between the outer sun gear outer teeth and the sun gear inner teeth; wherein:

when the centrifugal disc is rotating at a speed at or below the predetermined rotational speed, the centrifugal lock is held in the first, radially inward position on the centrifugal disc, the lock post connects with the capstan gear, the shaft is rotated by the centrifugal mechanism in a first direction corresponding to the direction of rotation of the centrifugal disc, and the rotation of the shaft lowers the support arm, and when the centrifugal disc is rotating at a speed above the predetermined rotational speed, the centrifugal lock moves into the second, radially outward position on the centrifugal disc, the outer lock teeth connect with the outer wheel teeth of the outer wheel, the outer wheel is rotated in a first direction corresponding to the direction of the centrifugal disc, and the shaft is rotated in a second direction opposite the first direction via a gear raising mechanism.

18. The bicycle of claim 14 further comprising:

a second hollow shaft connected to the bicycle frame, the second shaft including a top end and a bottom end, a second support arm telescopically deployable downward from the bottom end of the second shaft, and a second friction wheel rotatably supported by the second shaft, the second friction wheel extending from the top end of the second shaft such that the second friction wheel is in frictional contact with the bicycle wheel, wherein:

the hollow shaft, the support and the friction wheel are rotatably supported on a first side of the bicycle, and the second hollow shaft, second support arm and second friction wheel are rotatably supported on a second side of the bicycle.

19. A method for using a bicycle support mechanism that includes a hollow shaft connectable to a bicycle frame, the shaft including a top end and a bottom end, a support arm telescopically deployable downward from the bottom end of the shaft, a friction wheel rotably supported by the shaft, the friction wheel extending from the top end of the shaft such that the friction wheel is arranged to be in frictional contact with a bicycle wheel, an actuator being driven by the friction wheel, and the actuator including a centrifugal mechanism being rotated by the friction wheel, the method comprising:

lowering the support arm upon the centrifugal mechanism being rotated at a speed above zero and below a first predetermined rotational speed, and raising the support arm upon the centrifugal mechanism being rotated at a speed above a second predetermined rotational speed.

\* \* \* \* \*